No. 835,960. PATENTED NOV. 13, 1906.
A. J. LEAVER.
APPARATUS USED IN ELECTROPLATING.
APPLICATION FILED JUNE 11, 1906.
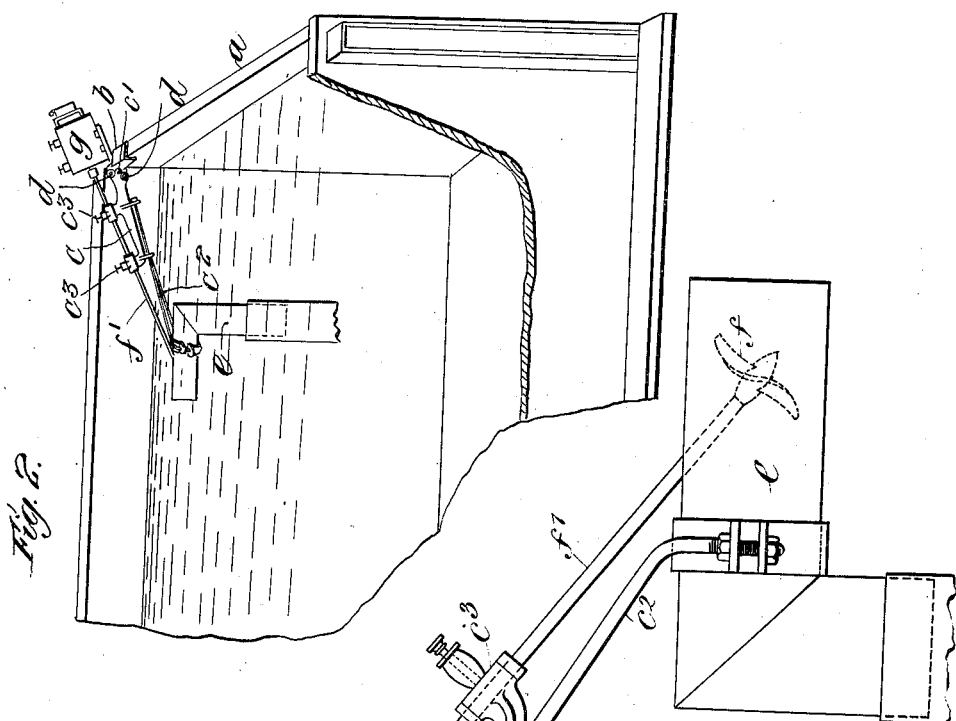
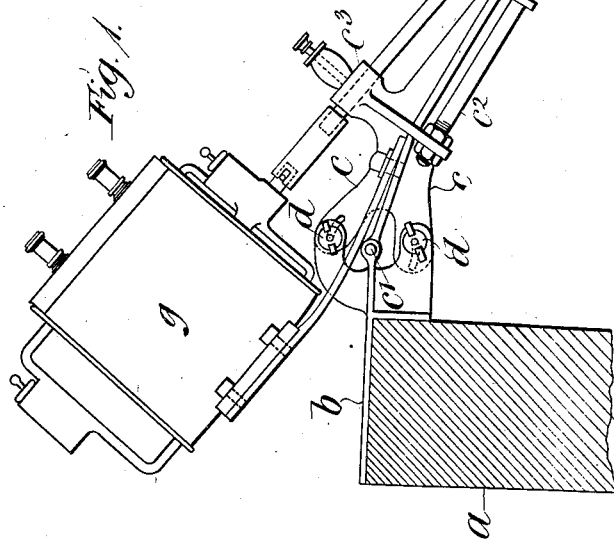
Witnesses.
E. B. Bruner.
C. F. Early.
Inventor.
Albert Joseph Leaver
By his Attorneys
Baldwin Wight

UNITED STATES PATENT OFFICE.

ALBERT JOSEPH LEAVER, OF LONDON, ENGLAND.

APPARATUS USED IN ELECTROPLATING.

No. 835,960.
Specification of Letters Patent.
Patented Nov. 13, 1906.

Application filed June 11, 1906. Serial No. 321,259.

*To all whom it may concern:*

Be it known that I, ALBERT JOSEPH LEAVER, electrometallurgist, a subject of the King of Great Britain, residing at Eyot Works, Hammersmith, London, England, have invented certain new and useful Improvements in Apparatus used in Electroplating, of which the following is a specification.

It is well known that great advantages are obtained by agitating and circulating the plating solution during the process of electrodeposition, and various methods have been adopted for doing this.

According to this invention I employ a screw or like propeller in a trunk immersed in the solution and extending as nearly to the bottom of the vat as may be desired.

The arrangement is preferably as follows: The trunk is bent through about a right angle, the horizontal branch of it in which the propeller is placed being normally near the surface of the solution; but means are provided by which its depth can be varied. If it is desired to aerate the solution, the trunk is raised until the propeller is partly above the surface. The trunk is supported by a frame carrying the bearings of the propeller-shaft, which passes into the trunk through a hole near its top. The frame is pivoted to a platform secured to the vat by a clamp or other suitable device. This platform supports an electric motor or other suitable means for driving the propeller-shaft through a universal joint or flexible connection or otherwise.

Figure 1 is an elevation, partly in section, of an apparatus constructed according to this invention; and Fig. 2 is a perspective view of the apparatus in use.

$a$ is the side of the vat, and $b$ is a platform fixed to it.

$c$ is a frame pivoted at $c'$ to the platform $b$ and secured at any desired inclination by the nuts $d$.

$e$ is a trunk carried by the bars $c^2$, fixed to the frame $c$. The vertical member of the trunk is preferably made telescopic, as shown.

$f$ is a screw-propeller fixed to the shaft $f'$, working in bearings $c^3$ on the frame $c$.

$g$ is an electric motor carried by the frame $c$ and driving the shaft $f'$.

What I claim is—

1. The combination of a vat, a trunk supported in the vat at a distance above the bottom of the vat, a screw-propeller in the trunk and means for driving the screw-propeller.

2. The combination of a vat, a trunk bent through a right angle, the lower side of the angle being approximately vertical and the upper side approximately horizontal; means for supporting the trunk above the bottom of the vat, a screw-propeller in the trunk and means for driving the screw-propeller.

3. The combination of a vat, a frame supported on the edge of the vat, a trunk supported by the frame at a distance above the bottom of the vat, a screw-propeller in the trunk and a motor carried by the frame and driving the screw-propeller.

4. The combination of a vat, a frame supported on the edge of the vat, a trunk bent through a right angle supported by the frame the lower side of the angle being approximately vertical and the upper side approximately horizontal, a screw-propeller in the trunk and a motor carried by the frame and driving the screw-propeller.

5. The combination of a vat, a frame hinged to the edge of the vat, a trunk supported by the frame at a distance above the bottom of the vat, a screw-propeller in the trunk and a motor carried by the frame and driving the screw-propeller.

6. The combination of a vat, a frame hinged to the edge of the vat, a trunk bent through a right angle supported by the frame, the lower side of the angle being approximately vertical and the upper side approximately horizontal, a screw-propeller in the trunk and a motor carried by the frame and driving the screw-propeller.

ALBERT JOSEPH LEAVER.

Witnesses:
THOMAS HOWARD EDMUNDS,
ROBERT GEORGE MARVIN.